T. H. ELLIS.
Car-Coupling.
No. 221,674.    Patented Nov. 18, 1879.
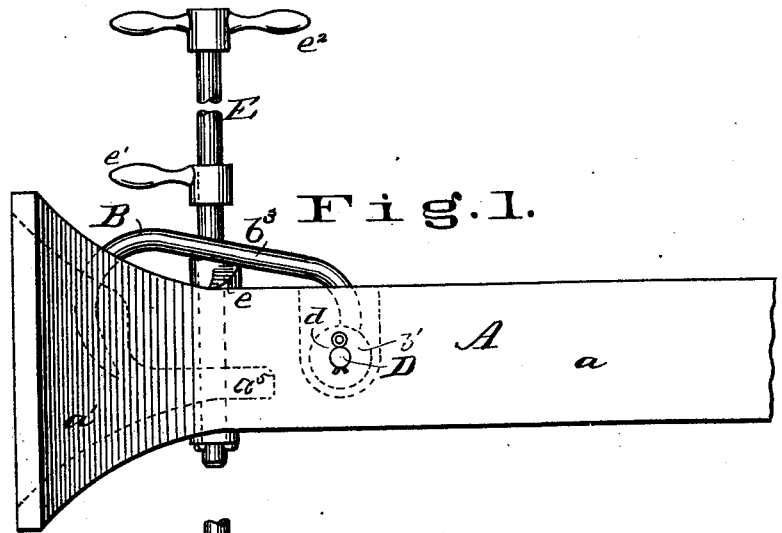
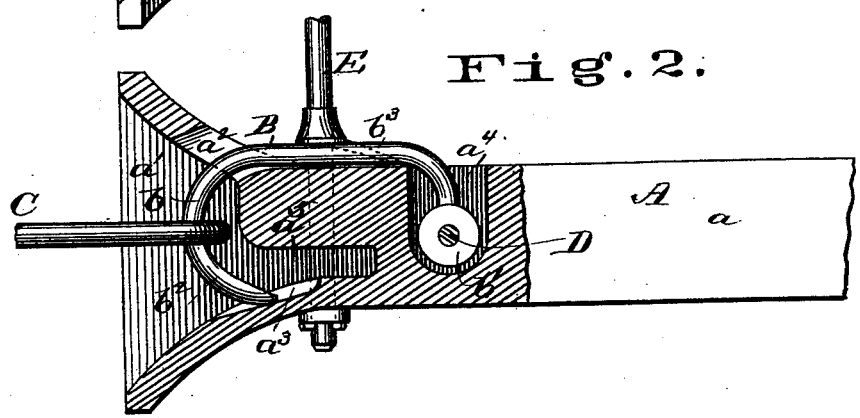
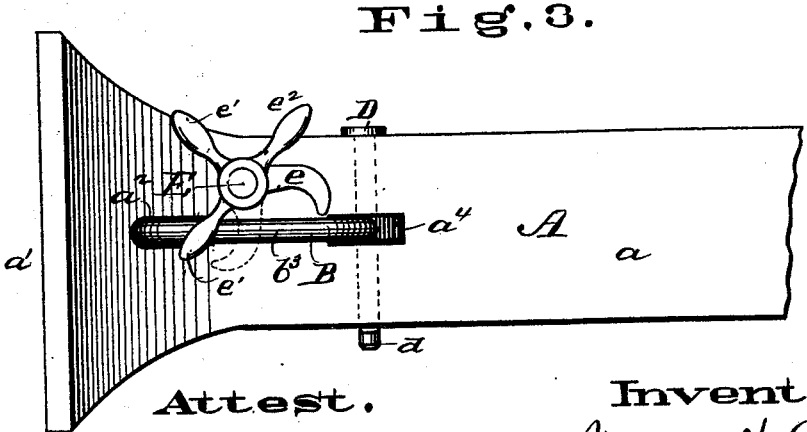
Attest.    Inventor.
Horatio D. Wood    Thomas H. Ellis.
Saml. S. Boyd    by Chas. D. Moody.
              atty.

UNITED STATES PATENT OFFICE.

THOMAS H. ELLIS, OF ST. LOUIS, MISSOURI.

IMPROVEMENT IN CAR-COUPLINGS.

Specification forming part of Letters Patent No. 221,674, dated November 18, 1879; application filed May 3, 1879.

*To all whom it may concern:*

Be it known that I, THOMAS H. ELLIS, of the city of St. Louis, Missouri, have made a new and useful Improvement in Car-Couplings, of which the following is a full, clear, and exact description, reference being had to the annexed drawings, making part of this specification, in which—

Figure 1 is a side elevation of the improved coupling; Fig. 2, a sectional elevation, and Fig. 3 a plan of the same.

The same letters denote the same parts.

The present invention is an improvement in that class of car-couplings wherein the coupling is effected automatically. The uncoupling can also be effected without requiring the operator to pass between the cars, and it can be done either from the ground or from the top of the car.

Referring to the drawings, A represents a draw-head, which, saving as modified by the present improvement, can be of the ordinary shape—that is, having a shank, $a$, and a flaring mouth, $a'$.

B represents what I term a "drop-hook." It takes the place of the usual coupling-pin. At its inner end it is hinged or otherwise so jointed to the draw-head as to enable its outer end, which is in the form of a hook, $b$, to be raised and lowered, to engage with, or to be disengaged from, the coupling-link C. For this purpose the hook B, by means of an eye, $b'$, at its inner end, is attached to, and made to turn upon, a bearing in the form of a pin, D, that is held transversely in the draw-head.

The hook is shaped and arranged as shown more distinctly in Fig. 2—that is, it extends from the pin D upward to above the shank $a$ of the draw-head, thence above the shank to the roof of the mouth $a'$, in which is a slot, $a^2$, through which the hook passes downward into the mouth $a'$. As it passes downward into the lower part of the mouth it curves inwardly, and the point of the hook, when the latter is down, rests in a groove, $a^3$, in the bottom of the mouth. The draw-head is also slotted at $a^4$ to receive the inner end of the hook.

The slots $a^2$ $a^4$ are preferably just wide enough to allow of the vertical movement of the hook, and the slot $a^2$ does not extend sufficiently forward to enable the hook C to be lifted entirely out of the draw-head mouth; but it can be moved to and from the positions indicated respectively in Figs. 1 and 2.

The coupling is effected as follows: The link C (being suitably held in the opposing draw-head) encounters that part $b^2$ of the hook which curves inwardly into the mouth $a'$. This causes the hook B to turn on the bearing D, and the part $b$ to rise sufficiently for the link to pass beneath it and into the chamber $a^5$. The point of the hook then falls through the link into the groove $a^3$. Then, when the coupling is tightened, the link, by reason of the curvature of the part $b^2$, is drawn up on the hook into the position shown in Fig. 2. As the link is drawn back it is, in consequence of the point of the hook being in the groove $a^3$, properly directed upward onto the hook, and when in this position it cannot be dislodged until the coupling is loosened again and the hook is lifted.

The uncoupling is effected as follows: As the coupling is slackened the link, by reason of the curvature of the part $b^2$, slides downward upon this last-named part, and far enough into the chamber $a^5$ to enable the hook to be lifted. For this last-named purpose a rod, E, is journaled vertically in the draw-head, and extending upward therefrom to any desired level, and to above the top of the car when used upon a freight-car. The rod is provided with an arm, $e$, that is arranged and shaped suitably to pass, as the rod is rotated beneath the part $b^3$ of the hook, and thereby lift the hook, as indicated in Fig. 1. The arm $e$ is beveled toward its outer end to enable it to readily pass under and to properly lift the hook, and it is also preferably curved, as shown in Fig. 3. As the rod E is rotated the arm $e$ operates like a wedge to lift the hook sufficiently to bring its point above the roof of the chamber $a^5$, whereupon the link can be withdrawn. On turning the rod E backward the arm $e$ is withdrawn from beneath the hook, allowing the latter to drop into its original position.

If it is desired to more securely fasten the hook B in the position shown in Fig. 2, the rod E might be furnished with another arm, properly arranged and shaped to come, as the rod is turned, above the part $b^3$ of the hook and hold it down. The rod is provided with a lever, $e'$, to enable the rod to be rotated when the operator is upon the ground at the side of the car, and with another lever, $e^2$, at its top when the operator is upon the roof of the car.

The hook B can be removed from the draw-head by loosening the fastening $d$ of the pin D, and withdrawing the latter from its bearing in the draw-head.

The chamber $a^5$ serves to receive the inner end of the link as the coupling is being effected, and also to hold the link horizontally when it is being presented to an opposing draw-head.

I am aware that in car-couplings hooks have been used in place of coupling-pins.

I claim—

1. The combination of the draw-head A, having the shank $a$ and flaring mouth $a'$, and being slotted at $a^2$ $a^4$, the hook B extended, as described, and having the parts $b$ and $b^2$ rigidly attached thereto and of the shape shown, the bearing D, and link C, substantially as shown and described.

2. The draw-head A, slotted at $a^2$ and $a^4$, and having the groove $a^3$ and chamber $a^5$, the hook B, shaped as described, and having the curved part $b^2$ rigidly attached thereto, the pin D, and the link C, combined and operating as described and shown.

3. The combination of the draw-head A, having the mouth $a'$ and the chamber $a^5$, the link C, and the hook B, pivoted at D, and having the curved part $b^2$, substantially as described.

Witness my hand.

THOMAS H. ELLIS.

Witnesses:
 CHAS. D. MOODY,
 SAML. S. BOYD.